United States Patent
Gu et al.

(10) Patent No.: US 8,738,824 B1
(45) Date of Patent: May 27, 2014

(54) LOW POWER AUDIO CODEC

(75) Inventors: Qinwei Gu, Shanghai (CN); Yu Bai, Shrewsbury, MA (US)

(73) Assignee: Marvell International Ltd. (BM)

( * ) Notice: Subject to any disclaimer, the term of this patent is extended or adjusted under 35 U.S.C. 154(b) by 481 days.

(21) Appl. No.: 13/083,767

(22) Filed: Apr. 11, 2011

Related U.S. Application Data

(60) Provisional application No. 61/326,521, filed on Apr. 21, 2010.

(51) Int. Cl.
*G06F 3/01* (2006.01)

(52) U.S. Cl.
USPC ............................................. 710/52; 710/33

(58) Field of Classification Search
None
See application file for complete search history.

(56) References Cited

U.S. PATENT DOCUMENTS

| | | | |
|---|---|---|---|
| 6,744,888 B1 * | 6/2004 | El-Kik et al. ................ | 379/412 |
| 6,829,493 B1 * | 12/2004 | Hunzinger ................... | 455/574 |
| 7,188,352 B2 * | 3/2007 | Nathan et al. ................ | 725/7 |
| 7,486,608 B1 * | 2/2009 | Long et al. ................... | 370/207 |
| 7,568,057 B2 * | 7/2009 | Lees et al. .................... | 710/52 |
| 7,587,525 B2 * | 9/2009 | Dahan et al. ................. | 710/22 |
| 7,616,627 B2 * | 11/2009 | Green et al. ................. | 370/364 |
| 7,778,838 B2 * | 8/2010 | Sebestian et al. ........... | 704/500 |
| 7,849,334 B2 * | 12/2010 | Juenemann et al. ......... | 713/300 |
| 8,041,848 B2 * | 10/2011 | Conroy et al. ............... | 710/22 |
| 8,270,389 B2 * | 9/2012 | Parnaby ........................ | 370/350 |
| 8,327,158 B2 * | 12/2012 | Titiano et al. ................ | 713/300 |
| 2004/0081045 A1 * | 4/2004 | Won et al. .................... | 369/47.33 |
| 2006/0187774 A1 * | 8/2006 | Koizumi et al. ............. | 369/44.27 |
| 2011/0019578 A1 * | 1/2011 | Berg et al. ................... | 370/252 |

* cited by examiner

*Primary Examiner* — Cheng-Yuan Tseng

(57) ABSTRACT

Systems, methods, and other embodiments associated with a low power audio codec are described. According to one embodiment, an apparatus includes an audio codec having an audio buffer configured to store decoded audio data received from a processor. The audio codec is configured to provide the stored decoded audio data to an audio device while decoded audio data is not being received from the processor. According to another embodiment, a method includes receiving a request for decoded audio data from an audio codec with an audio buffer, entering a RUN mode and providing decoded audio data stored in processor memory to the audio codec for storage in the audio buffer. After receiving a buffer full signal from the audio codec the method includes entering a low power mode while the audio codec provides an audio signal to an audio device.

10 Claims, 4 Drawing Sheets

LOW POWER AUDIO CODEC

CROSS REFERENCE TO RELATED APPLICATIONS

This application claims the benefit of U.S. provisional application Ser. No. 61/326,521 filed on Apr. 21, 2010, which is hereby wholly incorporated by reference.

BACKGROUND

Consumer demand for longer playback time on battery operated audio devices like cellular phones and PDAs is ever increasing. A typical playback time requirement for these types of devices is currently around 50 hours on a single battery charge. It is expected that minimum playback time requirements will soon increase to 100 hours.

SUMMARY

In one embodiment an apparatus includes an audio codec having an audio buffer configured to store decoded audio data received from a processor. The audio codec is configured to provide the stored decoded audio data to an audio device while decoded audio data is not being received from the processor. In one embodiment the apparatus also includes an independent audio codec clock that provides timing signals to the audio codec. In one embodiment, the audio codec is configured to receive audio data from the processor when the processor is in an IDLE mode and to provide audio data to the audio device when the processor is in a low power mode. The audio codec may be configured to request decoded audio data from the processor when an amount of decoded audio data stored in the audio buffer falls below a threshold.

In another embodiment, a system includes an application processor and an audio codec. The processor includes an audio data decoder configured to decode audio data; processor memory configured to store the decoded audio data; and one or more application processor clocks configured to provide timing signals to logical devices associated with the application processor. The audio codec receives decoded audio data from the processor memory and processes the decoded audio data to provide an audio signal to an audio device. The audio codec includes an audio buffer configured to store decoded audio data received from the processor memory. The audio codec is configured to process the decoded audio data stored in the audio buffer and to provide the audio signal to the audio device while decoded audio data is not being received from the application processor.

In one embodiment the system also includes an independent audio codec clock that provides timing signals to the audio codec. In one embodiment, the audio codec is configured to receive audio data from the application processor when the application processor is in an IDLE mode and to provide audio data to the audio device when the application processor is in a low power mode. The audio codec may be configured to request decoded audio data from the application processor when an amount of decoded audio data stored in the audio buffer falls below a threshold.

In another embodiment, a method includes receiving a request for decoded audio data from an audio codec with an audio buffer; entering a RUN mode and while in the RUN mode, providing decoded audio data stored in processor memory to the audio codec for storage in the audio buffer. The method also includes receiving a buffer full signal from the audio codec and entering a low power mode while the audio codec provides an audio signal to an audio device. In one embodiment, the method also includes entering an IDLE mode after receiving the buffer full signal and remaining in the IDLE mode for a predetermined threshold duration of time prior to entering a low power mode.

The method may also include decoding audio data and storing the decoded audio data in the processor memory while in the RUN mode. In one embodiment, the method also includes processing, with the audio codec, decoded audio data stored in the audio buffer and providing the processed decoded audio data to an audio device while the processor is in a low power mode. In another embodiment, the method also includes requesting decoded audio data from the processor when an amount of decoded audio data stored in the audio buffer falls below a threshold and storing the decoded audio data received from the processor in the audio buffer.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with reducing power consumption of an audio device during audio playback. In one embodiment, an audio codec includes an audio buffer that stores decoded audio data for processing by the audio codec while a processor that decoded the audio data is in a low power mode. The audio codec may also include an independent clock to provide timing signals to the audio codec when the processor clocks are not enabled. An audio codec with these features enables the processor to be placed in a low power consumption mode while the audio codec is processing decoded audio data stored in the audio buffer and providing the processed audio data as an audio signal to the audio device.

Figure 1A:
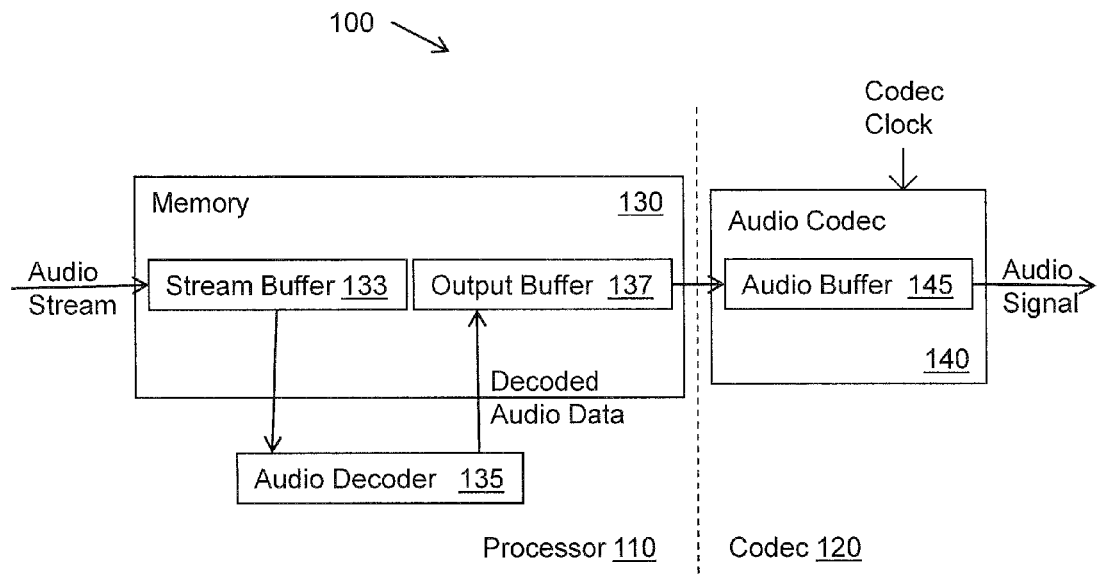
FIGS. 1A and 1B illustrate one embodiment of an apparatus associated with a low power audio codec.
Figure 1B:
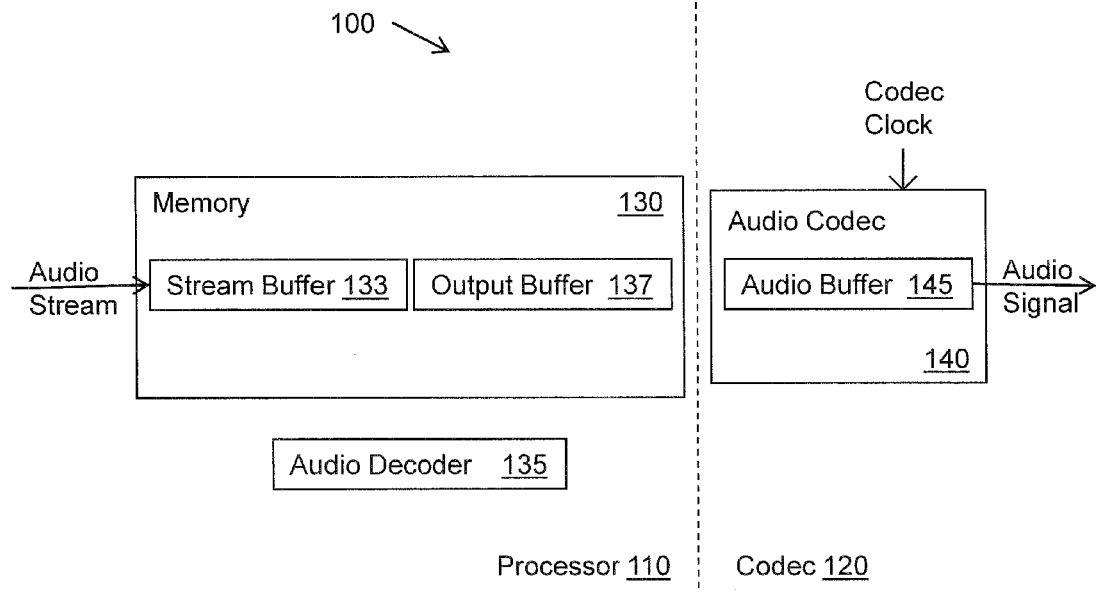

With reference to FIGS. 1A and 1B, one embodiment of an audio playback apparatus 100 is shown that includes a processor 110 and a codec 120. The processor 110 provides decoded audio data to the codec 120. In turn, the audio codec 120 processes the decoded audio data and outputs an audio signal for playback by the audio playback apparatus 100.

Referring now to FIG. 1A, in portions of playback operation of the audio playback apparatus, the processor 110 receives an encoded audio stream from external memory (e.g., storage card) and temporarily stores the audio stream in one or more stream buffers 133. The processor 110 includes an audio decoder 135 (e.g., Windows Media Player) that decodes the audio stream and stores the resulting decoded audio data in one or more output buffers 137. In one embodiment, the output buffer 137 has a memory capacity of 32 KB. During the decoding operation the processor 110 is in RUN mode, meaning that processor components, clocks, and peripherals are in normal operation. Of course, the processor 110 is consuming a maximum or near maximum amount of power while in RUN mode.

The processor 110 provides the decoded audio data to the codec 120 by transmitting the decoded audio data to a low power audio codec 140. The low power audio codec 140 stores the decoded audio data in an audio buffer 145. In one embodiment the audio buffer 145 has a memory capacity of 8 KB. During this transmission of decoded audio data, the processor 110 can either be in RUN mode (while decoding audio data) or in IDLE mode (while transmitting decoded audio data to the low power audio codec 140). In one embodiment, in IDLE mode processor clocks are gated while system bus, main memory, and external peripherals operate normally. The amount of power consumed by the processor 110 during IDLE mode is less than during RUN mode, however, in IDLE mode, power is consumed by the processor to transmit the decoded audio data.

FIG. 1B illustrates operation of the audio playback apparatus 100 once the audio buffer 145 has been filled with decoded audio data from the processor's output buffer 137. The processor 110 enters a low power mode in which direct memory access is not allowed. In some embodiments, the low power mode is a STANDBY mode in which a processor core and peripherals are stopped in low leakage state with context retained. The low power audio codec 140 continues to provide the audio signal for playback by processing the decoded audio data stored in the audio buffer 145. To facilitate operation of the codec 120 while the processor 110 is in a low power mode in which processor clocks may not be operating, the codec 120 may include a codec clock that operates independently of processor clocks (not shown) to provide timing signals to the low power audio codec 140.

The audio buffer 145 allows the low power audio codec 140 to store decoded audio data for future processing. Thus, the processor 110 can enter a low power mode while the audio codec 140 continues to provide the audio signal. This results in a reduction in power consumption as compared to conventional audio codecs that do not include an audio buffer. In audio playback devices that include conventional audio codecs, the processor 110 does not enter a low power mode in which direct memory access is not allowed because decoded audio data is continuously being supplied to the audio codec by the processor. Thus, with a conventional audio codec, a processor will cycle between RUN (decoding audio data) and IDLE (transmitting decoded audio data to the audio codec) modes.

Figure 2:
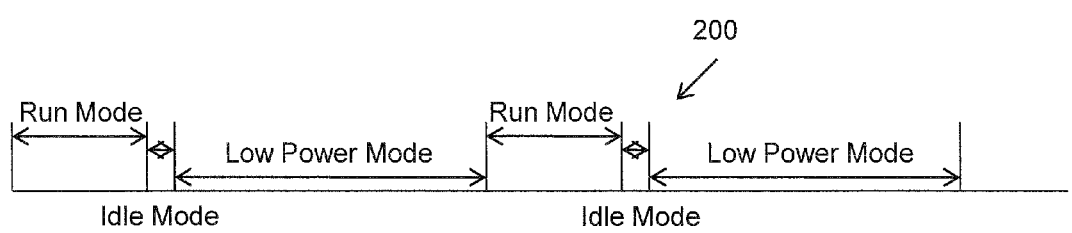
FIG. 2 is a timeline that illustrates the operation one embodiment of a low power audio codec.

FIG. 2 depicts a timeline 200 that illustrates operation of one embodiment of an audio playback apparatus that includes a low power audio codec. The timeline 200 shows two cycles of processor operation modes during audio playback. The relative amount of time in each mode shown in FIG. 2 is approximate and will vary depending on operational parameters like processor operating frequency. As already discussed above, the processor operates in RUN mode when decoding audio data and storing the data in its output buffer. At the same time, decoded audio data is being transmitted to the audio codec for storage in the audio buffer. After the processor has decoded sufficient audio data to fill the output buffer, the processor transitions to IDLE mode while transmitting decoded audio data to the audio codec.

Once the audio buffer in the audio codec is full, the processor can transition into a low power mode. In one embodiment, this transition from IDLE to low power mode occurs after a predetermined IDLE time threshold has occurred. In one embodiment, the predetermined IDLE time threshold is approximately 3 milliseconds. An optimal IDLE time threshold may be determined based on measurement of the amount time the processor spends in IDLE mode in various playback scenarios. The amount of time required to enter and exit the low power mode should also be considered in determining an appropriate IDLE time threshold.

As can be seen in FIG. 2, the audio buffer in the audio codec allows the processor to spend a significant amount of time in low power mode during audio playback. This results in significant reduction in power consumption as compared to conventional audio codec devices in which the processor remains in IDLE mode to continuously transfer decoded audio data to the audio codec. For an audio playback in which the processor operates at 60 Hz, transitioning to low power mode after 3 milliseconds allows the processor to operate in low power mode approximately one third of the time instead of spending that time in IDLE mode. Assuming 1000 mA-Hr battery capacity, for a typical audio device this results in approximately twelve additional hours of audio playback on a single battery charge.

Figure 3:
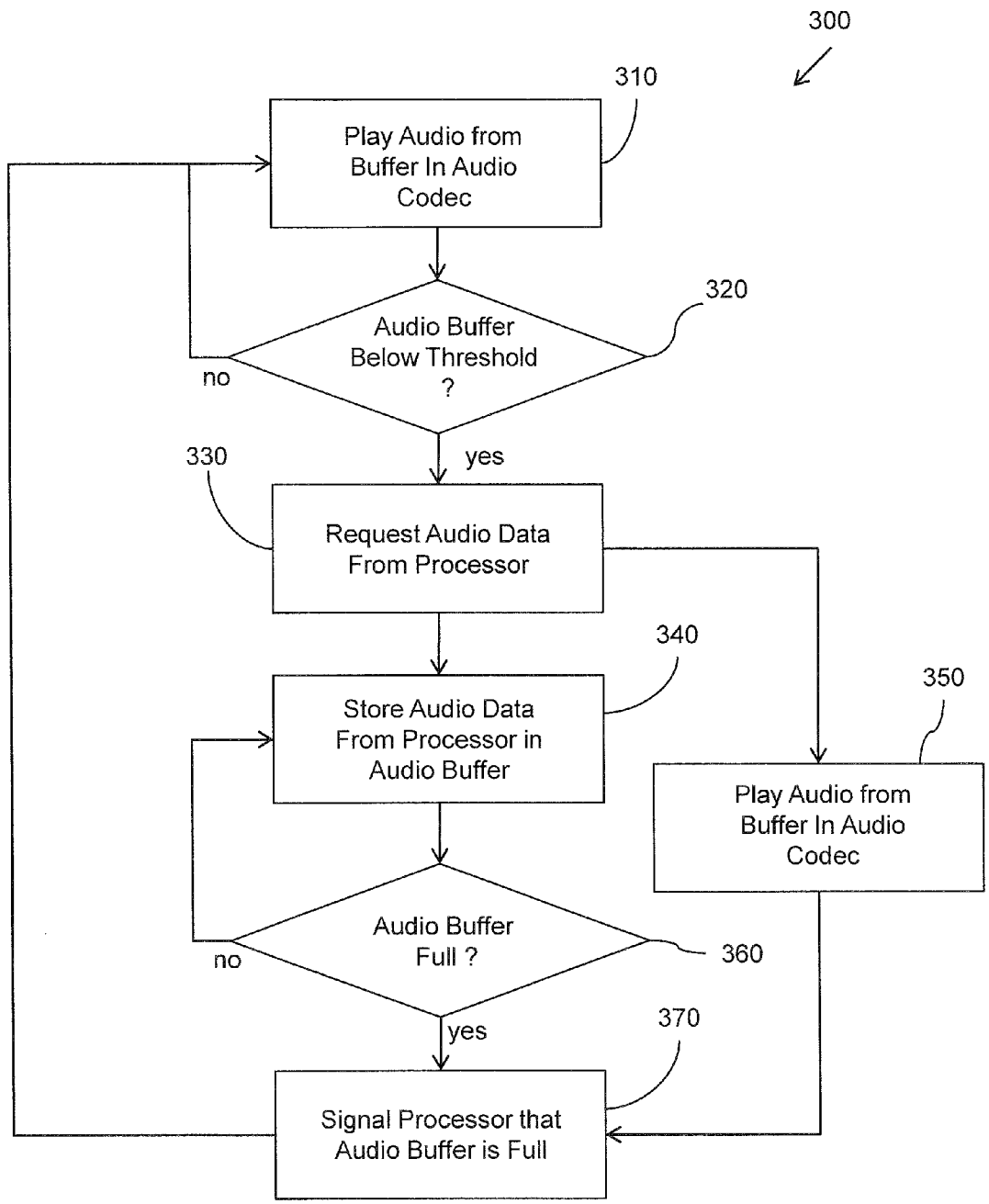
FIG. 3 illustrates one embodiment of a method associated with a low power audio codec.

FIG. 3 is a flow diagram outlining a method 300 according to which one embodiment of an audio codec with an audio buffer operates. At 310 the audio codec sends an audio signal to be played by an audio device. At 320 the method includes determining if an amount of decoded audio data stored in the audio buffer on the audio codec is below a threshold amount. If the audio buffer still contains sufficient decoded audio data, the method continues to provide the audio signal for the audio device to play. If the amount of decoded data in the audio buffer is below the threshold, at 330 the method requests decoded audio data from the processor while continuing to provide the audio signal for the audio device to play at 350. At 340, decoded audio data from the processor is stored in the audio buffer. At 360, the method determines if the audio buffer is full. If the audio buffer is not full, the method continues to store audio data in the audio buffer at 340. Once the audio buffer is full, at 370 a signal is sent to the processor to alert the processor that the audio buffer is full. The processor can then transition to low power mode.

Figure 4:
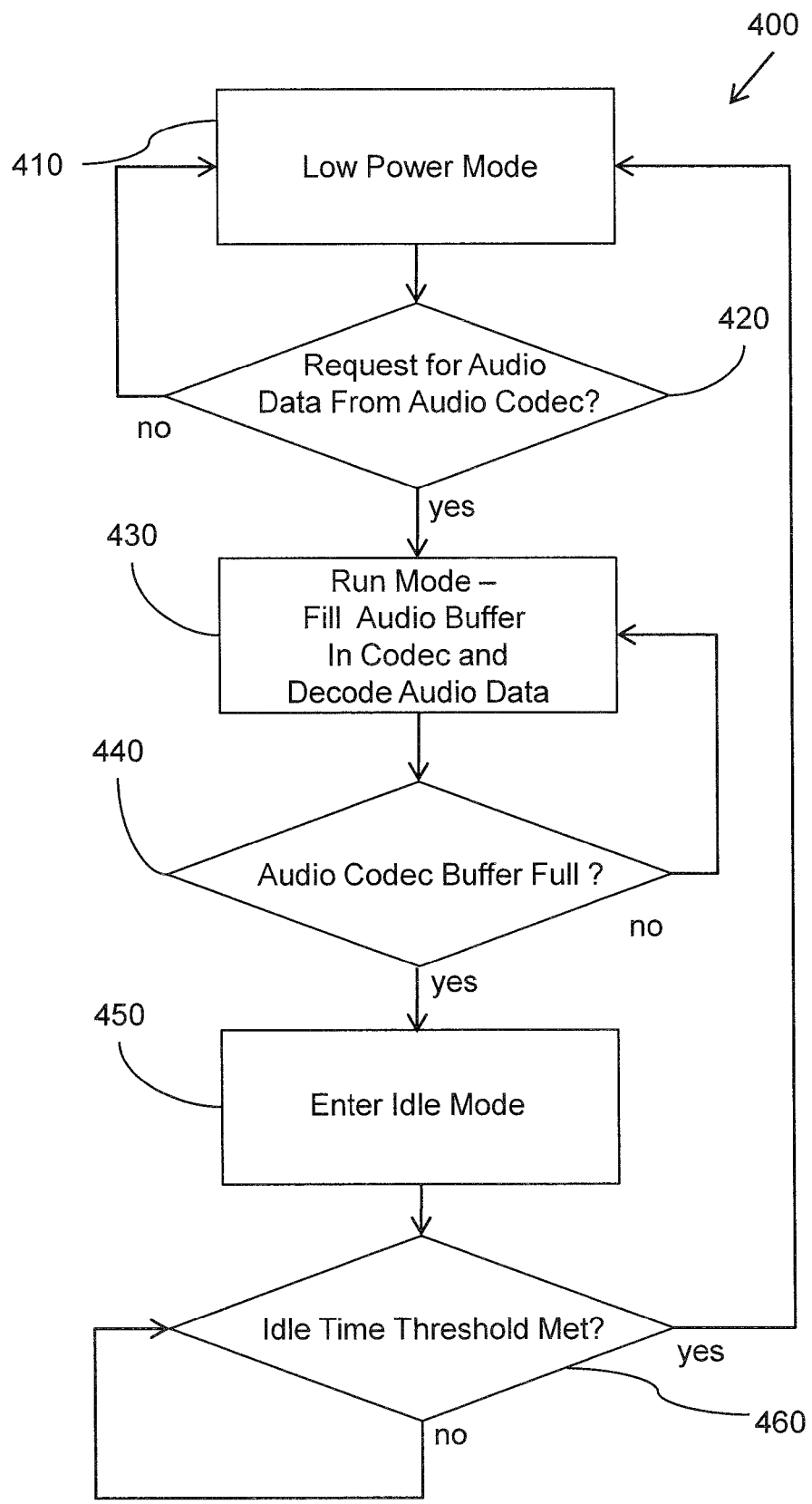
FIG. 4 illustrates one embodiment of a method associated with a low power audio codec.

FIG. 4 is a flow diagram outlining an example of a method 400 for providing decoded audio data to an audio codec having an audio buffer. At 410 the processor is in low power mode in which direct memory access is not allowed and power consumption is minimal. At 420, the method determines if the audio codec is requesting decoded audio data and if not, the processor remains in low power mode at 410. If the audio codec is requesting decoded audio data, at 430 the processor enters RUN mode and begins to decode and transmit audio data to the audio codec to fill the audio buffer.

At 440 the method determines whether the audio buffer is full. If the audio buffer is not full, the method continues to fill the audio buffer at 430. If the audio buffer is full, the processor enters IDLE mode at 450. At 460, the method determines if the IDLE time threshold has been met. Once the IDLE time threshold has been met, the processor enters low power mode at 410.

An audio playback device that includes an audio codec with an audio buffer is able to enter a low power mode while playing audio. This reduces device power consumption and increases playback time.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An audio codec apparatus, comprising:
    an audio codec comprising
        an audio buffer configured to store decoded audio data received from an application processor external to the audio codec, wherein the application processor is configured to decode audio data in a RUN mode; and
        wherein the audio codec is configured to:
            receive decoded audio data from the application processor when the application processor is in IDLE mode;
            provide the stored decoded audio data to an audio device while the application processor is in a low power mode; and
            request decoded audio data from the application processor when an amount of decoded audio data stored in the audio buffer falls below a threshold and when the application processor is in the low power mode; and
    further wherein the application processor consumes less power in low power mode than in IDLE mode and less power in IDLE mode than RUN mode.

2. The apparatus of claim 1, further comprising an audio codec clock that provides timing signals to the audio codec; wherein the audio codec clock operates independently of a clock that provides timing signals to the application processor.

3. The apparatus of claim 1, wherein the audio buffer comprises eight kilobytes of memory.

4. A system, comprising:
    an application processor configured to operate in a RUN mode, an IDLE mode, and a low power mode, wherein the application processor consumes less power in IDLE mode than in RUN mode, and less power in low power mode than in IDLE mode, the application processor comprising:
        an audio data decoder configured to decode audio data while the application processor is in RUN mode; and
        an output buffer configured to store the decoded audio data, and output the decoded audio data while the application processor is in IDLE mode;
    an audio codec configured to receive decoded audio data from the output buffer while the application processor is in IDLE mode and to process the decoded audio data to provide an audio signal to an audio device, the audio codec comprising:
        an audio buffer configured to store decoded audio data received from the output buffer; and
        wherein the audio codec is configured to process the decoded audio data stored in the audio buffer and to provide the audio signal to the audio device while the application processor is in low power mode, and to request more decoded audio data from the application processor when an amount of decoded audio data stored in the audio buffer falls below a threshold.

5. The system of claim 4, wherein the audio codec further comprises an audio codec clock that provides timing signals to the audio codec; wherein the audio codec clock operates independently of the one or more application processor clocks.

6. The system of claim 4, wherein a storage capacity of the output buffer is at least two times the storage capacity of the audio buffer.

7. A method, comprising
    with an application processor:
        receiving, a request for decoded audio data from an audio codec with an audio buffer;
        entering a RUN mode and while in the RUN mode, decoding audio data and storing decoded audio data in an output buffer;
        entering an IDLE mode when the output buffer is full of decoded audio data and while in the IDLE mode, providing the decoded audio data stored in the output buffer to the audio codec for storage in the audio buffer;
        receiving a buffer full signal from the audio codec; and
        entering a low power mode while the audio codec provides an audio signal derived from the decoded audio data in the audio buffer to an audio device;
    wherein less power is consumed by the application processor while operating in IDLE mode than in RUN mode, and less power is consumed while operating in low power mode than in IDLE mode.

8. The method of claim 7, comprising remaining in the IDLE mode for a predetermined threshold duration of time prior to entering the low power mode.

9. The method of claim 7, comprising
    with the audio codec:
        processing, decoded audio data stored in the audio buffer; and providing the processed decoded audio data to an audio device as an audio signal while the application processor is in a low power mode in which direct memory access by the application processor is not allowed.

10. The method of claim 9 comprising with the audio codec:

requesting decoded audio data from the application processor when an amount of decoded audio data stored in the audio buffer falls below a threshold; and storing decoded audio data received from the application processor in the audio buffer.

* * * * *